Aug. 26, 1941.   E. B. NICKLES ET AL   2,254,083
REMOTELY CONTROLLED CRANE OR THE LIKE
Filed March 16, 1938   11 Sheets-Sheet 4
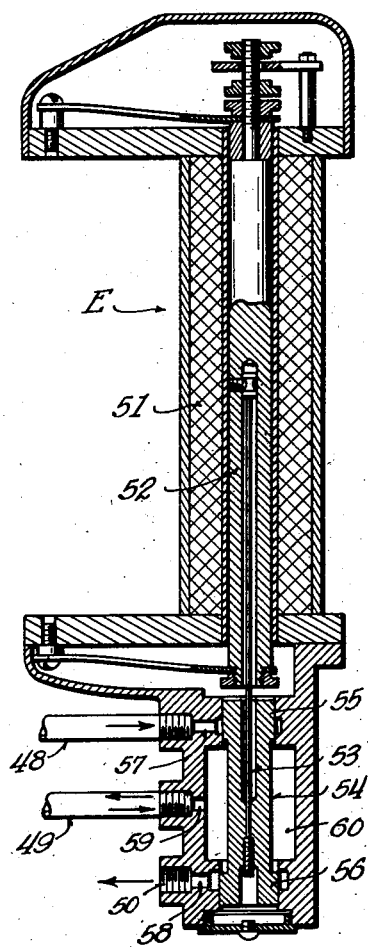
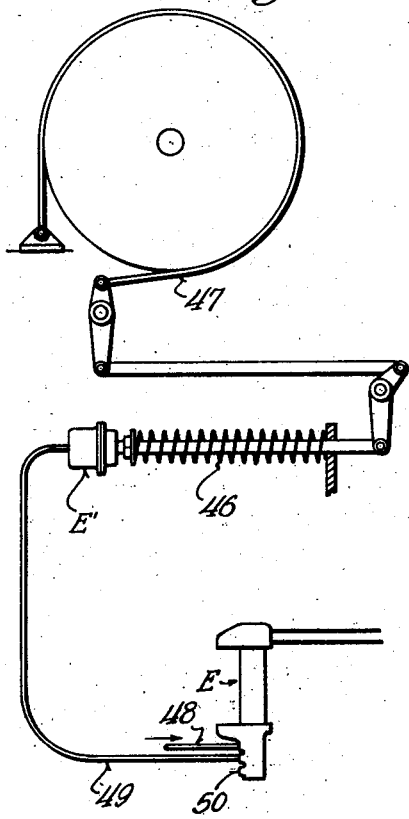
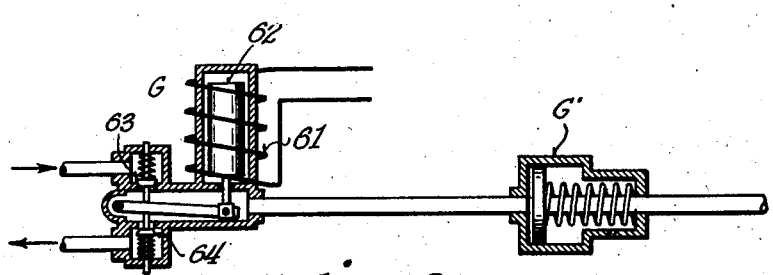
INVENTORS
EDWARD B. NICKLES
JOHN D. WEST
BY
ATTORNEY.

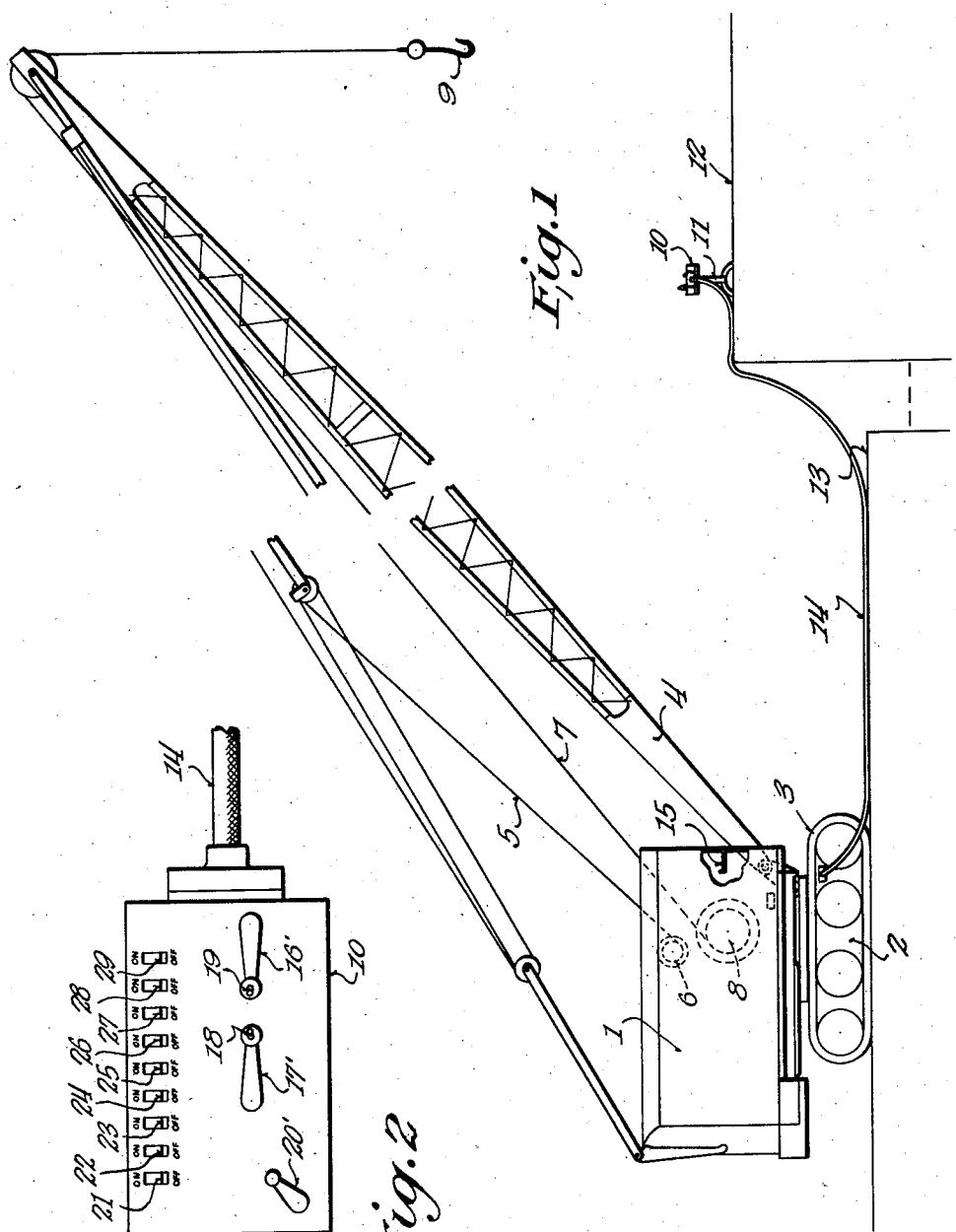

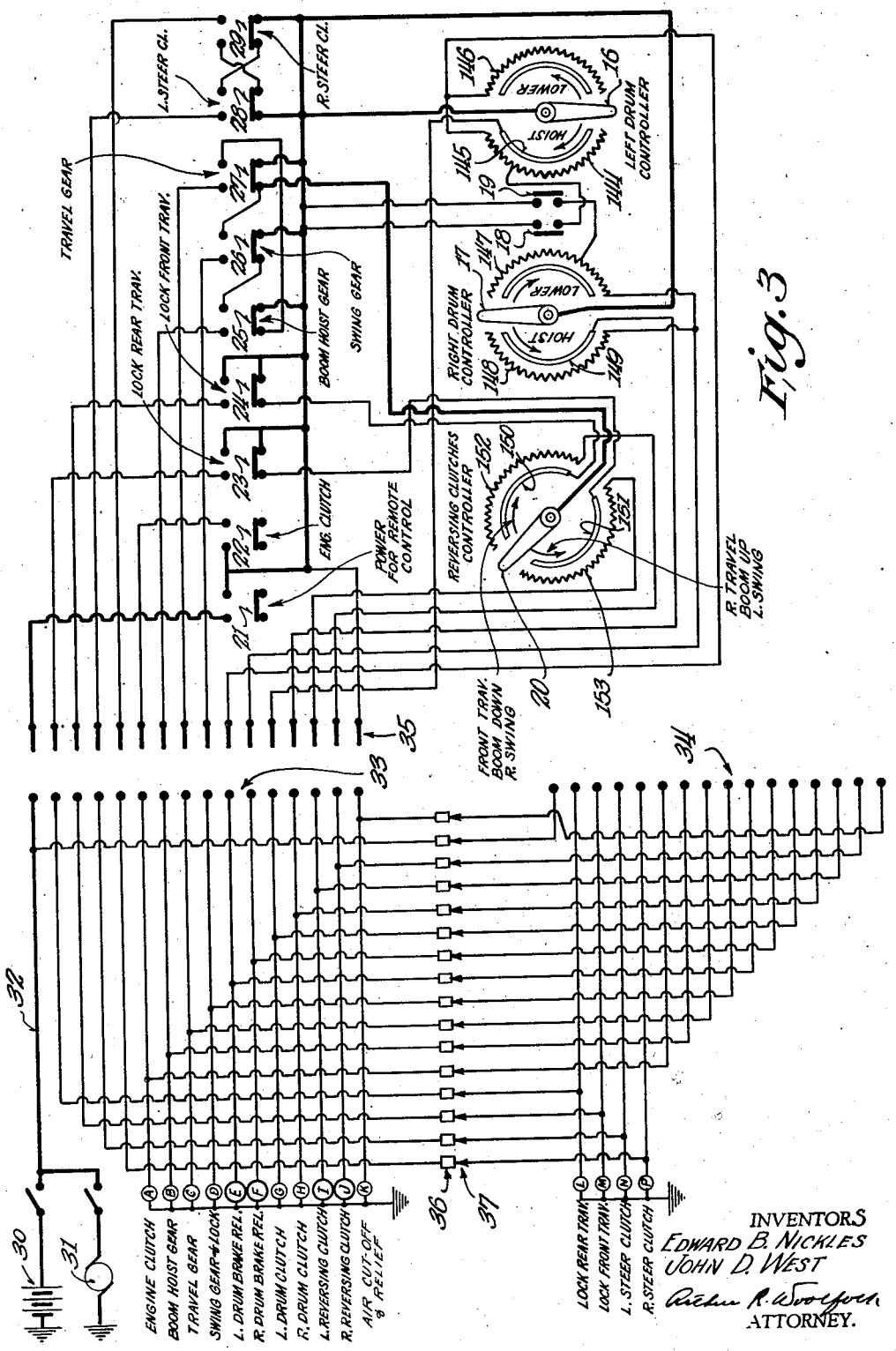

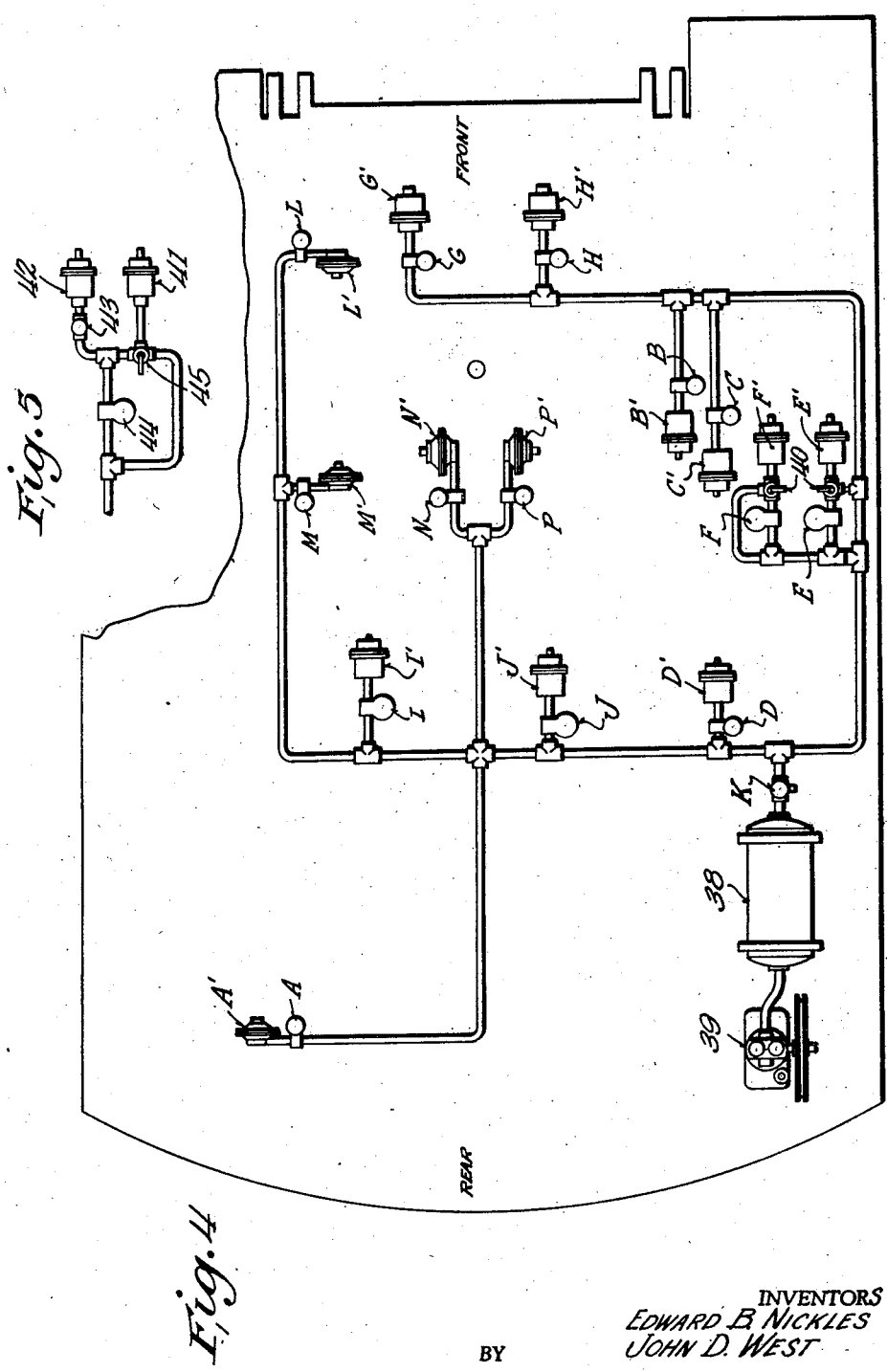

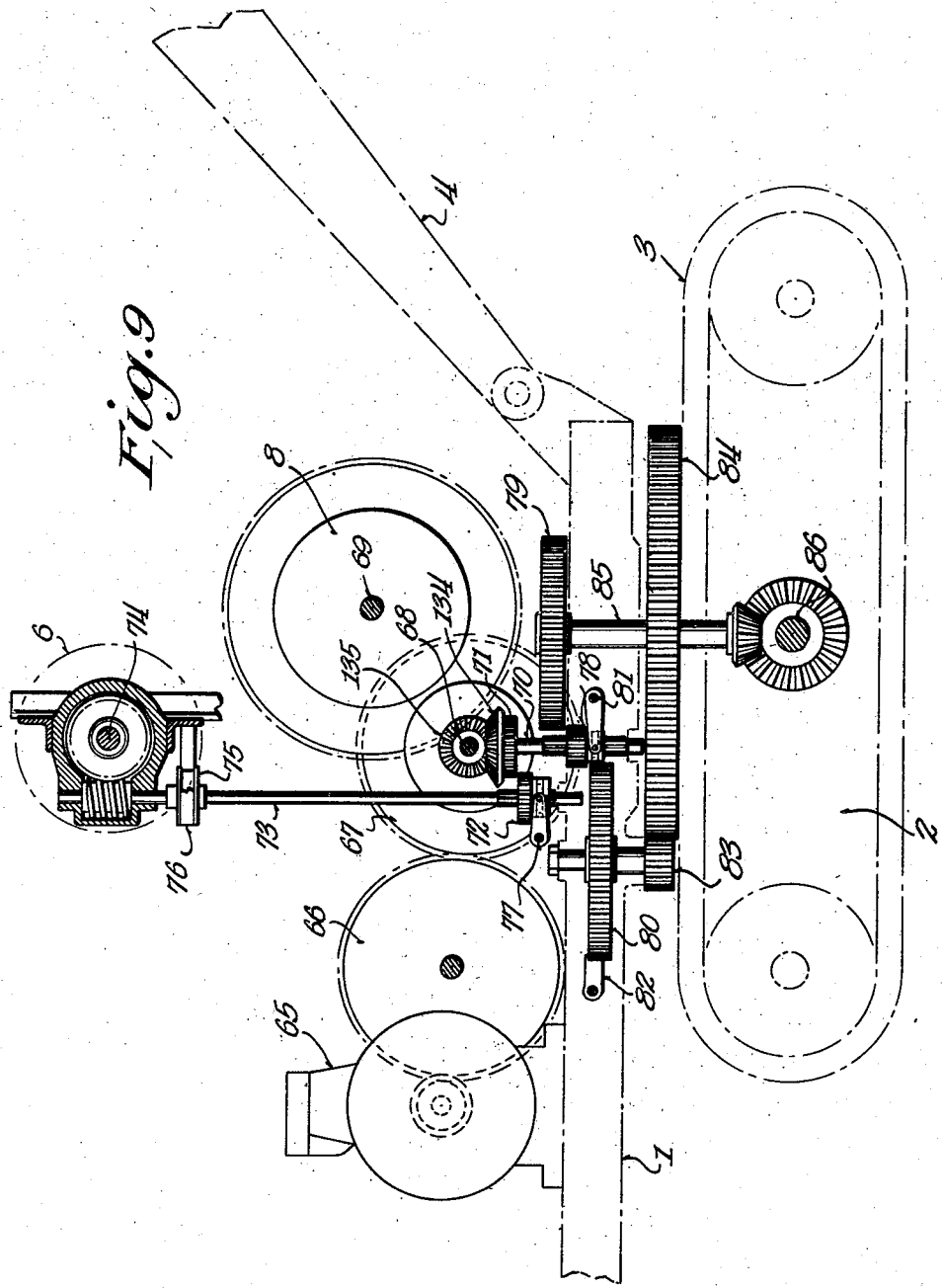

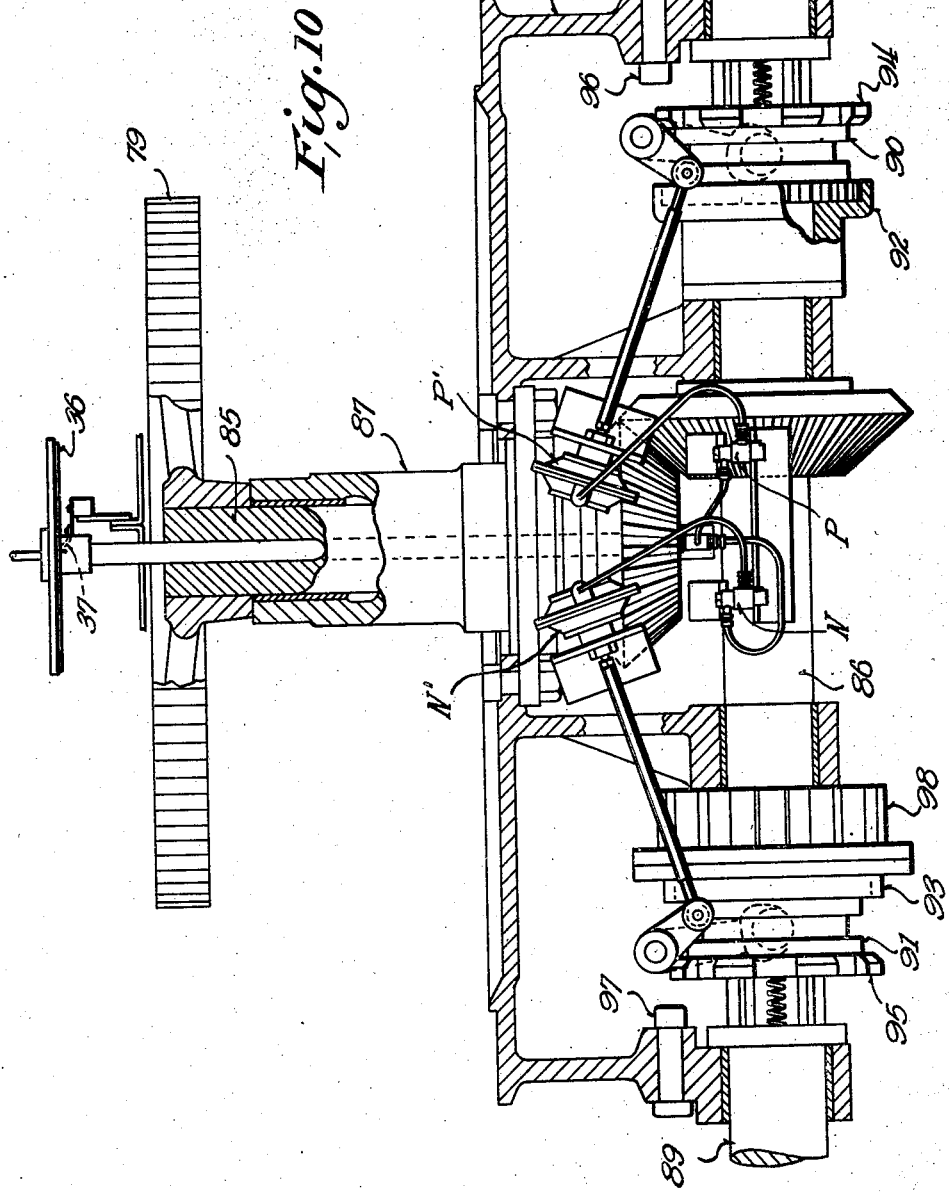

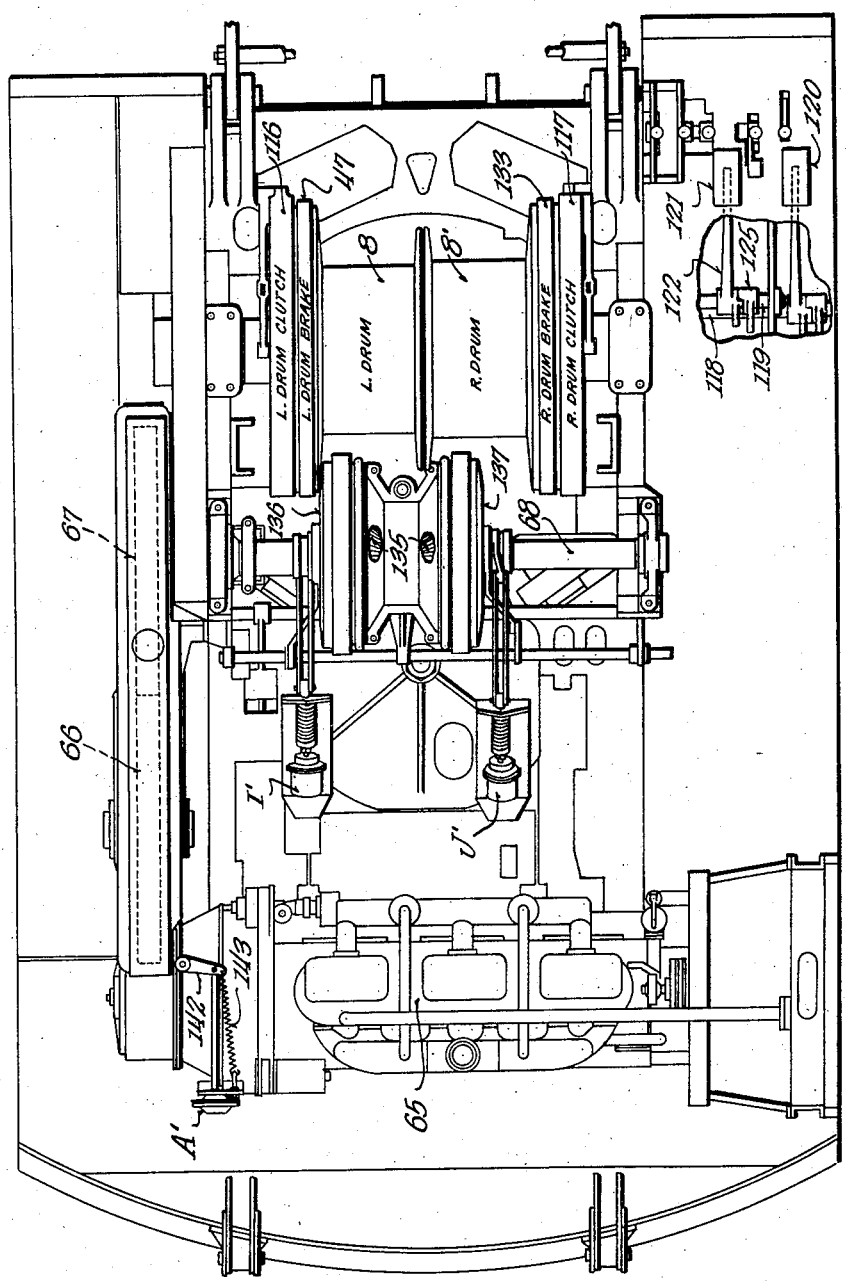

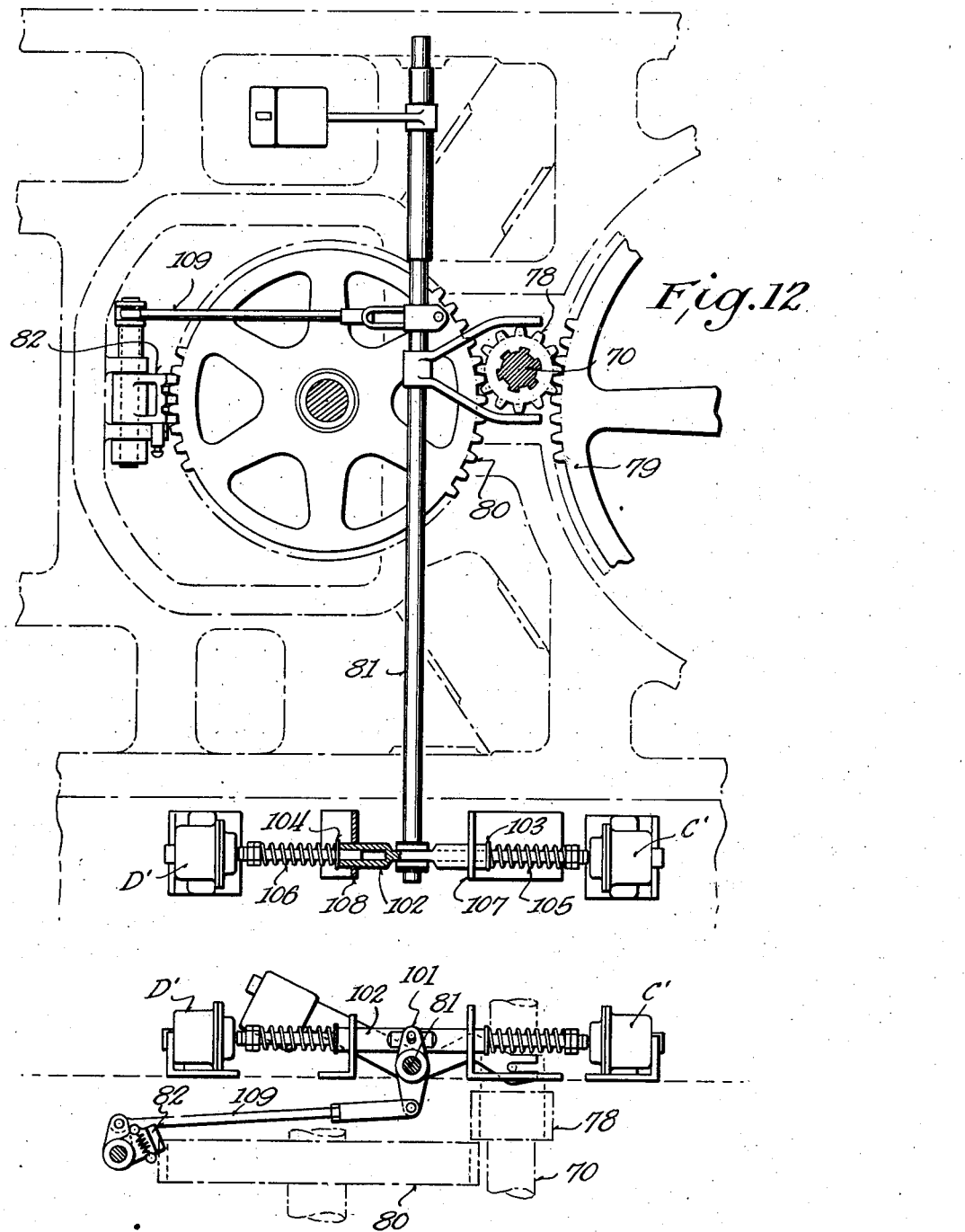

Aug. 26, 1941.   E. B. NICKLES ET AL   2,254,083
REMOTELY CONTROLLED CRANE OR THE LIKE
Filed March 16, 1938   11 Sheets-Sheet 9
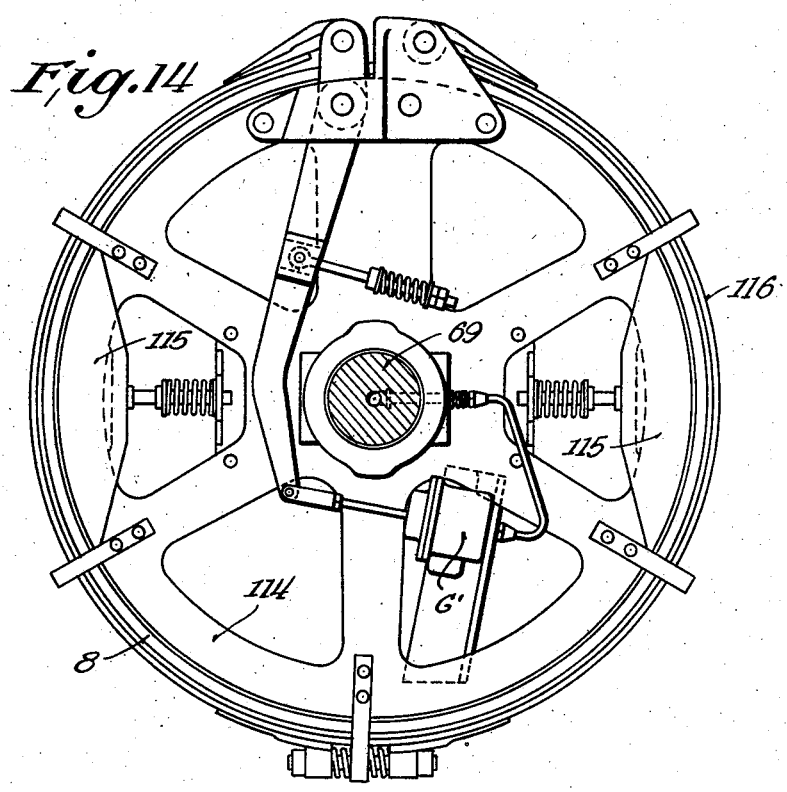
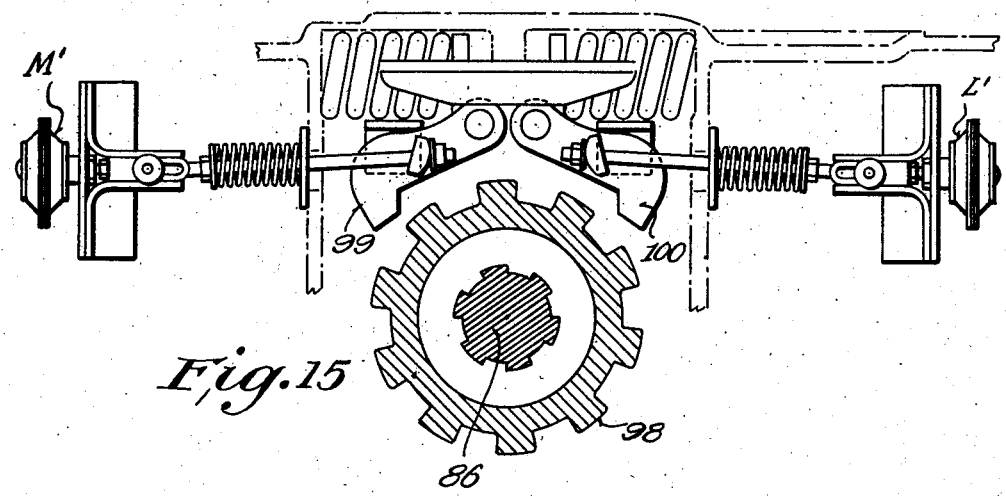
INVENTORS
EDWARD B. NICKLES
JOHN D. WEST
BY
ATTORNEY.

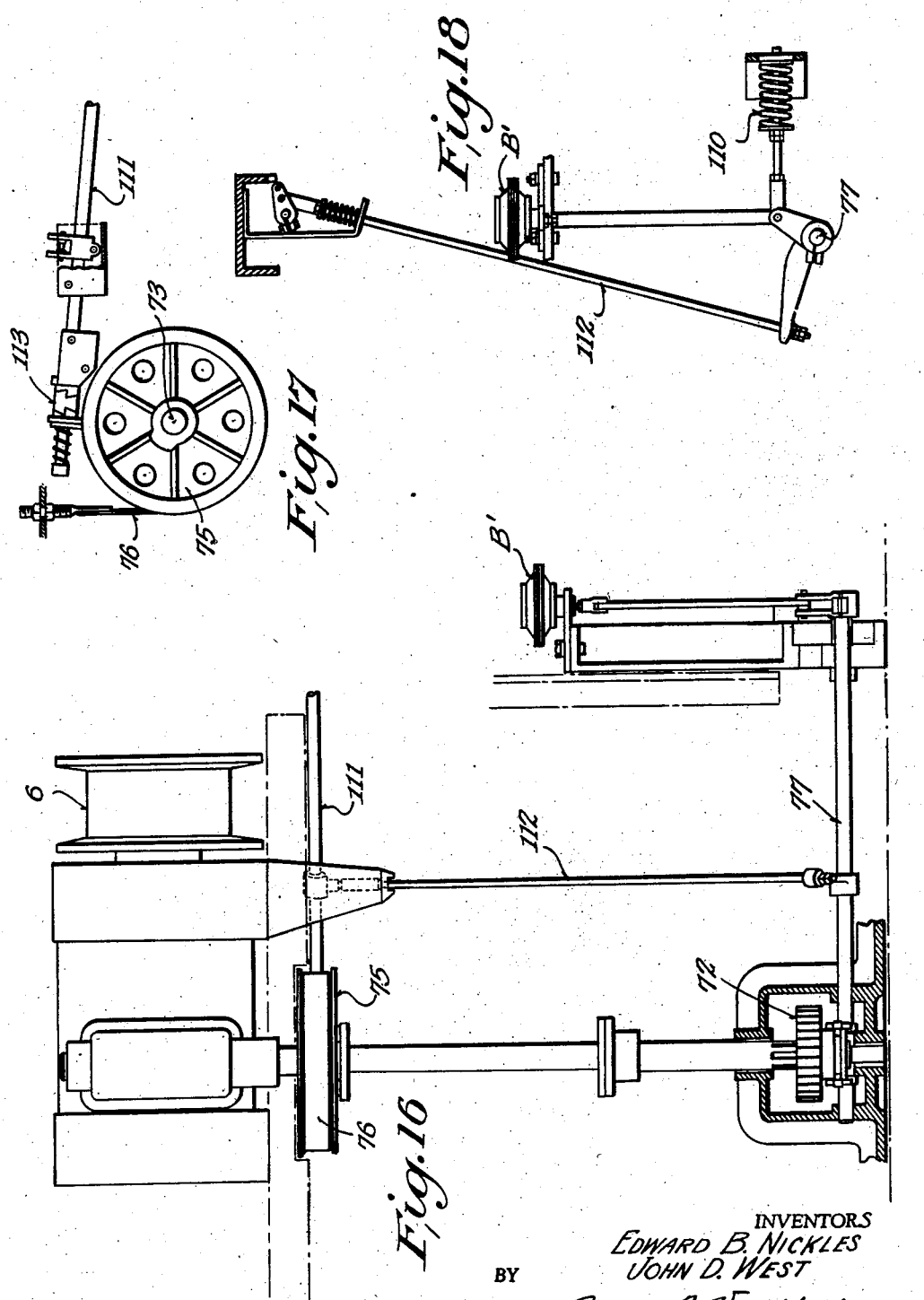

Aug. 26, 1941. E. B. NICKLES ET AL 2,254,083
REMOTELY CONTROLLED CRANE OR THE LIKE
Filed March 16, 1938 11 Sheets-Sheet 11
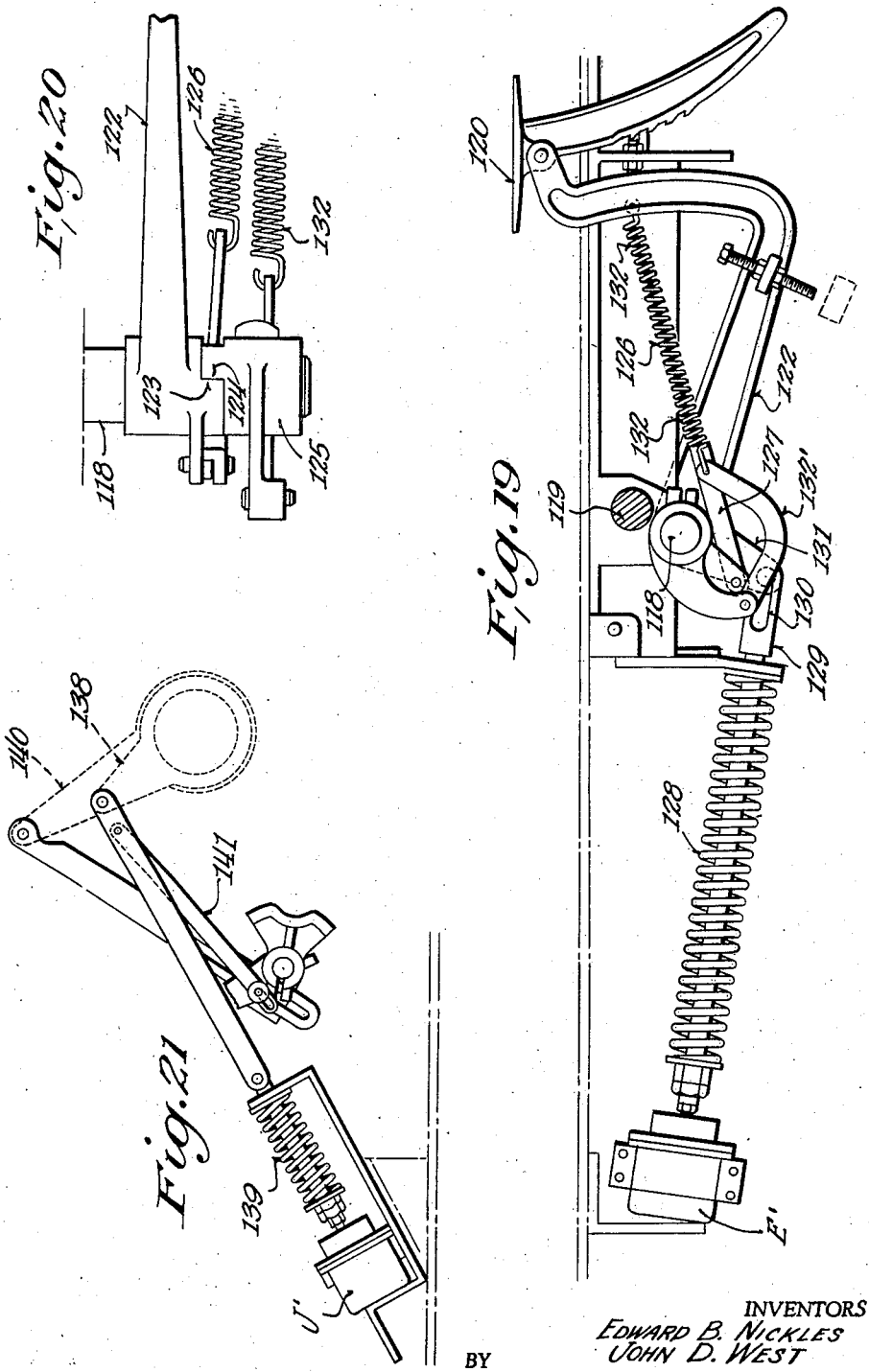
INVENTORS
EDWARD B. NICKLES
JOHN D. WEST
BY
ATTORNEY.

Patented Aug. 26, 1941

2,254,083

UNITED STATES PATENT OFFICE 2,254,083

REMOTELY CONTROLLED CRANE OR THE LIKE

Edward B. Nickles and John D. West, Manitowoc, Wis., assignors to Manitowoc Shipbuilding Company, Manitowoc, Wis.

Application March 16, 1938, Serial No. 196,246

18 Claims. (Cl. 212—38)

This invention relates to a remote control for a crane, shovel, drag line, or similar machine.

It frequently happens in using cranes or similar machines that the point at which the operation is taking place is not in full view of the operator when he is located in the cab. In certain operations it is impossible for the operator to watch the hook or clamshell bucket, for instance when loading or unloading boats. Under these conditions the operator cannot see the bucket or hook or load handling means when it passes into the hatch of the boat and it is therefore necessary to have a signal man at the hatch in view of an operator located in the cab.

This invention is designed to provide a remote control for a crane or the like which is so constructed that only one operator is needed and this operator may be located at the remote point so that the hook or other member is always visible to him, and in which the arrangement is such that this remotely located operator can control all of the operations of the crane from his remote position while at all times having the hook or load handling means in full view.

Ordinarily the operator of a crane is located within the cab and uses both his hands and both his feet in the control of the crane. This invention has for its further object the provision of remote control means for a crane in which all of the operations ordinarily performed by the operator in the cab may be performed by the remote operator by using only his two hands.

Further objects are to provide a remote control for a crane which is provided with interlocking control units to prevent interfering operations of different parts of the crane, and which is provided with safety control means which may be brought into use in the event of adverse or unexpected conditions during the operation of the crane.

Further objects of this invention are to provide a remote control means which is electrically operated and which may, and preferably does, employ low voltage and relatively small currents so that the multiple cable to the remote control means may be of relatively small size, in which the electrical control means controls a source of power at the crane, for example compressed air, to thereby provide a relay action between the remote control means and the local control means located in the cab, the local control means furnishing the actual power for moving the different control elements of the crane, and in which a graduated or graded control of certain of the control units within the cab may be had from the remote point to prevent a too sudden application of power or release of brakes for instance, and to provide safety means controlled from the remote point which may open an engine clutch for instance and which may relieve all of the air pressure from the air-operated local control means in the event any of the valves stick or any unexpected condition suddenly develops so as to provide a safe, reliable remote control means that gives absolute control of the crane.

Further objects of this invention are to provide a remote control means which may be located at a remote point, which is freely portable and may be shifted from time to time in an easy manner, which may be moved from the remote point to a position within the cab itself, and which when so positioned may control in the same manner as when at the remote point or which may be supplemented by the operator using the foot brakes for example, without interference from the remote control means, and additionally to provide for the plugging in or connecting of the remote control means either to the car body or to the cab as desired.

Further objects are to provide remote control means which may have a series of handles for the control of different groups of the mechanisms of the crane and in which a single handle or control member may simultaneously control both the clutch and the brake of a particular drum for instance, so that the operator may swing the handle to either hoisting or lowering position without independent operation of the brake or clutch for that particular drum, and in which a gradual release of the brake is obtained and the clutch is allowed to take hold and control the load so that sudden shock or sudden shifting of the load is prevented.

Further objects are to provide remote control means having a series of handles for the control of different groups of the mechanisms of the crane, for example at least two handles for a two-drum crane, in which one or both of the handles may be provided with auxiliary switches which may be operated to relieve the brake on one of the drums while the clutch of the other drum is closed so as to wind the cable not in active operation in accordance with or in step with the active cable, particularly when used for two-cable clamshell bucket operation, the operator being required to operate only one handle at a time for this double function.

Embodiments of the invention are shown in the accompanying drawings, in which:

Figure 1 is a view showing the crane and the remote control.

Figure 2 is a plan view of the remote control member.

Figure 3 is a wiring diagram of the remote control means and the valves controlled thereby.

Figure 4 is a diagrammatic plan view of the pneumatic system.

Figure 5 is a fragmentary view of a modified form of a portion of the pneumatic system.

Figure 6 is a vertical sectional detail showing one of the remote controlled pressure regulating valves.

Figure 7 is a diagrammatic view showing diagrammatically a brake controlled from such valve.

Figure 8 is a diagrammatic view showing an on and off remote control valve with an associated cylinder and piston.

Figure 9 is a diagrammatic view of the main driving mechanism of the crane, the parts, however, being shifted out of their true mechanical position for the sake of clearness.

Figure 10 is a transverse view, partly in section, showing the drive for the crawlers.

Figure 11 is a plan view looking down into the cab of the crane with parts broken away.

Figure 12 is a plan view, with parts broken away, showing the shift gear for the travel and swing operations and the swing lock.

Figure 13 is a fragmentary end view of the air operated means for shifting the shift gear, such view also showing the swing locking gears.

Figure 14 is an end view of one of the drum clutches and the associated parts.

Figure 15 is a view showing the forward and rear travel locking means.

Figure 16 is a view of the boom hoist drum, brake, and gear shift assembly.

Figure 17 is a detail of the brake for the boom hoist.

Figure 18 is a view showing the pneumatic means for operating the boom hoist shift gear and brake.

Figure 19 is a view of one of the foot pedals and also the air operating means for operating one of the drum brakes.

Figure 20 is a fragmentary plan view of a portion of the structure shown in Figure 19.

Figure 21 is a view of the air operated means and a portion of the clutch mechanism for the reversing clutches.

Before describing the details of the remote control crane, a brief summary of the operations will be given.

In remote control operation, all of the brakes are spring set and are air released. It sometimes happens that it is desirable to place the remote control unit in the cab, and under these conditions certain of the springs may be normally released and the brakes may be applied by foot pedals.

There are four pressure regulating valves and these regulating valves regulate the pressure applied to the air operating means for the brake release of the two drums and for operating the reversing clutches. All of the other air valves are three-way on and off valves.

There are three controller arms or handles for the remote control means. The right-hand handle controls the left drum clutch and left drum brake. The middle controller controls the right-hand drum clutch and the right-hand drum brake. The left-hand controller controls the two reversing clutches on the main drive shaft, such clutches transmitting power either to the boom hoist, the crawlers, or the swing mechanism.

The remote control means also includes a series of nine small switches which control respectively the electrical power of the entire remote control system, the engine clutch, the means for locking against rear travel, the means for locking against front travel, the boom hoist shift gear, the swing shift gear, the travel shift gear, the left steering clutch, and the right steering clutch.

These small switches are arranged in electrical interlocking relation in the following groups: The right steering switch and the left steering switch constitute a two-unit interlocking system. The lock against rear travel and the lock against forward travel and the reversing clutches controller form a three-unit interlocking system. The boom hoist shift gear switch, the swing shift gear switch and the travel shift gear switch form a three-unit interlock. These interlocks are so arranged that conflicting operations cannot occur, as will be apparent as the detailed description proceeds.

The crane or similar machine may be of any desired type. A simple load handling crane has been chosen for illustrating the invention.

Referring to Figure 1, it will be seen that the crane comprises a cab or rotating body 1, a crawler base 2 provided with crawlers 3, a boom 4, a boom hoist cable 5, a boom hoist drum 6, a load hoisting cable 7, a drum 8. As will be seen as the description proceeds, the crane is in reality provided with two drums corresponding to the drum 8 either or both of which can be used, as for clamshell bucket operation and other operations. However, to simplify the description, only one of the drums, namely, the left-hand drum, is employed in the operation of the crane.

The load handling means may take any form desired, a hook 9 having been illustrated.

The remote control means is indicated at 10, see Figures 1 and 2, and may comprise the box like member 10 as indicated, which may be supported upon a pedestal 11 or in any other manner when located at the remote point, for example as on the deck of a boat 12, the crane standing on the pier 13. Ordinarily in loading and unloading a boat, the crawlers 3 will be turned at right angles to the position shown in Figure 1, but they have been illustrated as in Figure 1 in order to simplify the disclosure. Usually the crane will be positioned for unloading through one hatch and thereafter will crawl or travel to another position parallel to the boat for unloading successive hatches.

The remote control means is provided with a cable 14 which is adapted to plug into either the crawler base, as shown, or into the cab or rotating body, suitable outlets being provided as indicated in Figure 1. Further, the cable 14 may be plugged into or detached from the remote control means 10 as desired, so that a shorter or longer cable may be substituted.

This remote control means 10 is adapted to be used at a remote point, or if desired may be placed within the cab and detached from the pedestal 11 and carried upon any suitable support, such as indicated at 15, within the cab so that the operator may control the crane from within the cab and still use the remote control member 10 for effecting the control. As will appear hereinafter, he also may supplement this control by the use of foot pedals.

The remote control means 10 includes the controller handle 16' and the controller handle 17' which may be provided with small switches 19 and 18 respectively. It is also provided with a controller handle 20'. These controller handles 16', 17' and 20' are connected with the switch arms 16, 17 and 20 respectively, as shown in Figure 3 in the wiring diagram. The small switches 19 and 18 carried by the controller handles 16' and 17' are illustrated diagrammatically in Figure 3.

The remote control means 10 is provided with a series of small switches 21 to 29, as shown in Figure 2. For the sake of simplicity the same numbers are applied to the diagrammatic showing of the switches 21 to 29 in Figure 3. In each of Figures 2 and 3 the upper position in the figures is the closed position for these series of switches. The power for operating the electrical equipment may be supplied from a battery 30, see Figure 1, and a charging dynamo 31. These are carried within the cab and have one side grounded, as indicated. The live power line is indicated at 32 and supplies the entire remote control system. Two series of socket contacts are provided in the crane. One series indicated generally at 33 is carried within the cab or rotating body, and the other series indicated generally at 34 is carried in the crawler base. Further the series of plugs or plug-in portions from the cable leading from the remote controller are indicated generally at 35 in Figure 3.

The elements of the upper socket member 33 in the cab are connected electrically to the elements of the lower socket member 34 carried by the crawler base through the medium of conductors passing through the center post and a series of slip rings 36 and brushes 37, see Figures 3 and 10.

The entire remote control is effected through a series of electromagnetic air controlling valves which have been indicated in Figures 3 and 4 by letters. The valves are listed as follows:

A—Engine clutch control valve.
B—Boom hoist gear control valve.
C—Travel gear control valve.
D—Swing gear and lock control valve.
E—Left drum brake release control valve.
F—Right drum brake release control valve.
G—Left drum clutch control valve.
H—Right drum clutch control valve.
I—Left reversing clutch control valve.
J—Right reversing clutch control valve.
K—Air cut-off and relief valve.
L—The control valve for locking against rear travel.
M—The control valve for locking against front travel.
N—Left steering clutch control valve.
P—Right steering clutch control valve.

*Pneumatic system*

The pneumatic system is diagrammatically shown in Figure 4 and comprises a compressed air supply tank 38 supplied by a compressor 39 driven from the engine in any conventional way. The tank supplies the several valves hereinbefore described through an air cut-off and relief valve K. Each of the valves, with the exception of the valve K, controls an air operated member, either a cylinder, a piston, or a diaphragm type of device for operating the respective parts as listed for the electromagnetic valves hereinabove.

These air controlled pressure responsive members are lettered with the primes of their control valves in Figure 4. As an illustration, the left drum brake cylinder E' is controlled by the valve E and the right drum brake cylinder F' is controlled by the valve F.

If desired, a hand controlled three-way valve 40 may be provided for by-passing the valves E and F, if it becomes desirable to hold either or both of the brakes off permanently and to take them out of the control of their respective valves. The valves E and F, which control the left drum brake release and the right drum brake release, and the valves I and J, which control the left reversing clutch and the right reversing clutch, are pressure regulating valves which adjust the pressure in a graduated manner in approximate proportion to the amount of current supplied such electromagnetic valves.

These four valves have been indicated by large circles in Figures 3 and 4. All the other valves are on and off, three-way valves and are indicated by small circles in Figures 3 and 4. These on and off valves turn on the full pressure or else cut off the pressure and discharge the air from their respective air pressure responsive members. This arrangement gives a gradual control of the right and left drum brakes and of the right and left reversing clutches, whereas the other members controlled by the valves are either completely on or completely off.

As shown in Figure 4, the air cut-off and relief valve K, which is also remotely controlled as are all the other valves, is provided to cut off the entire air supply from the pneumatic system and to discharge the air from such system, thus relieving all air pressure in the pneumatic system leading to the several valves so that if any one of the valves should stick or become inoperative, a safety relief cut-off is provided to arrest any further action of the crane.

In the system shown in Figure 4, each of the air operated members is individually controlled by its corresponding valve.

If it is desired to have a joint control, for example when it is desired to control a clutch and a brake so that the operation of each of the members may be gradual and controlled by one of the pressure regulating valves, the connections may be made as shown in Figure 5. In this case the left drum brake and the left drum clutch operating members, corresponding to the members E' and G' of Figure 4, are indicated at 41 and 42 in Figure 5 and the on and off valve for controlling the clutch, corresponding to the valve G, is indicated at 43. The pressure regulating valve, corresponding to the valve E of Figure 4, is indicated at 44 in Figure 5. A hand operated, three-way valve 45 is provided so that the brake operating cylinder may be by-passed around the valve 44 if it is desired to hold the brake off permanently.

The operation of the modified portion of the system shown in Figure 5 differs from the corresponding parts shown in Figure 4 in that the clutch operating member 42 is under the joint control of the on and off valve 43 and the pressure regulating or pressure graduating valve 44, so that when the clutch valve 44 is opened, the clutch operating member 42 and the brake operating member 41 are under the joint control of the pressure regulating valve and each comes on gradually, the brake releasing in a gradual manner as the clutch takes hold. On the other hand, if the on and off valve 43 is closed and the valve 44 is operated, the brake may be released without operating the clutch when the valve 44 is opened.

*Electro-pneumatic valves*

The pressure regulating valves E, F, I and J are all alike. The left drum brake release pressure regulating valve E is shown in Figures 6 and 7, and in Figure 7 is shown as controlling the left drum brake release cylinder E'. This cylinder is provided with a piston acting against a spring 46 and releasing the brake 47, the brake being set by the spring 46. The air supply line to the pressure regulating valve E is indicated at 48, the line to the cylinder E' at 49, and the exhaust for the valve at 50. This view is merely a diagrammatic view of the brake and the air cylinder.

This pressure regulating valve is described in greater detail in the copending application of John D. West, Serial No. 160,108 filed August 20, 1937, for Electromagnetic control devices, now Patent No. 2,159,610 of May 23, 1939. It comprises a solenoid 51 which acts to raise a plunger 52, such plunger being connected by means of a flexible connector 53 with a differential valve 54. The differential valve has a smaller upper portion 55 and a larger lower portion 56 which respectively control the air pressure inlet port 57 and the exhaust port 58. The port communicating with the air cylinder E' is indicated at 59 and communicates with the centrally located chamber 60 of the valve so that the pressure within the chamber 60 of the valve is identical with the pressure within the air cylinder E'.

The valve is shown in the position just as it commences to exhaust from the cylinder E'. Assume that current of a certain value, depending on the resistances put in the circuit by the controller, is passing through the winding 51, the plunger 52 is pulled upwardly and admits air through the port 57 until the pressure in the chamber 60, which is the same as the pressure in the cylinder E', builds up so that the action on the differential valve urging it downwardly just balances the pull of the solenoid. At this time the valve 54 will float in its central position, cutting off both the inlet and the exhaust and maintaining this pressure.

If the current is increased or decreased, the valve again shifts to adjust the pressure in the chamber 60, and consequently in the cylinder E', in exact proportion to the pull exerted on the plunger 52, and in this way proportions the air pressure to the amount of current flowing in the coil 51, thus providing a graduated or regulated control of the air pressure for the remote controller.

It is not necessary to have this type of valve in all positions as all the other valves need only be on and off valves of the conventional type, as diagrammatically illustrated in Figure 8 for one of such valves, for example the on and off valve G for the left drum clutch. Such on and off valve may comprise a solenoid 61 acting on the plunger 62 to open the inlet valve 63 and allow the closing of the exhaust valve 64, such valves being seated by springs. When the current is cut off, the inlet valve closes and the exhaust valve opens.

*Mechanical details of the crane*

The schematic or pictorial view Figure 9 does not have the exact mechanical arrangement of the parts as shown in the remaining detailed mechanical views, but they are arranged in Figure 9 in this schematic manner to give a clearer picture of the general mechanism of the crane.

The engine or other motor for driving the crane is indicated at 65 and is connected through the idler gear 66, or any other manner, to the gear 67 of the main transverse drive shaft 68. The main drive shaft 68 is connected by gearing with the transverse drum shaft 69 on which the right and left drums 8' and 8 respectively, see Figures 9 and 11, are loosely mounted. The main drive shaft 68 is connected by bevelled gearing with a vertical, downwardly extending shaft 70 which is provided with a gear 71 normally out of mesh with a sliding pinion 72 carried on the vertical worm shaft 73 for driving the boom drum shaft 74. The shaft 73 is provided with a brake drum 75 which cooperates with the brake band 76 for the boom hoist drum 6. The pinion 72 is moved into and out of mesh with the gear 71 by means of the rock shaft 77, such pinion being slidably splined on the shaft 73.

The shaft 70 extends downwardly and is provided with a slidably splined shift pinion 78 which is adapted to engage either the gear 79 for traveling or the gear 80 for swinging. Normally the pinion 78 remains in neutral position, as will hereinafter be described. Its position is controlled by means of the rock shaft 81.

The rock shaft 81 is coupled in a suitable manner hereinafter described with the swing lock 82 which engages the teeth of the swing gear 80 and locks the crane against swinging motion when so engaged. It is free of the gear 80 when the pinion 78 is in mesh with such gear and the lock engages the gear 80 when the pinion 78 is in mesh with the gear 79 and also when in neutral. The gear 80 drives a relatively smaller pinion 83 which meshes with the fixed gear 84 carried rigidly by the crawler body. The gear 79 is mounted axially with the center of rotation of the rotating body 1 and is rigid on a shaft 85. The shaft 85 is connected by beveled gearing with the transverse shaft 86 in the crawler base 2, as shown in Figures 9 and 10. The shaft 85, see Figure 10, extends through the king pin 87 about which the rotating body or cab 1 rotates, such rotating body being supported from the crawler base in the usual manner not shown. The right and left crawler drive sprocket, not shown, is connected respectively to right and left short shafts 88 and 89 aligned with the shaft 86, see Figure 10.

As shown in Figure 10, right and left clutch members 90 and 91 are slidably splined on the shafts 88 and 89 and are spring urged inwardly into engagement with corresponding clutch members 92 and 93.

The clutch members 90 and 91 are provided with notched outer portions 94 and 95 and as these clutch members are slidably splined on the shafts 88 and 89 respectively, they may be moved out of engagement with the clutch members 92 and 93 on the driving shaft 86 and thus disconnect one or the other of the crawlers from the drive. When either clutch member 90 or 91 is moved outwardly, such clutch member is adapted to be locked to the crawler body. For example, the clutch member 90 when moved to the right, causes the notched portion 94 to engage the pin 96 carried by the crawler base 2, a similar pin 97 being provided for the notched member 95. Only one of these pins is engaged at a time, as for example when it is desired to lock one of the crawlers and drive the other, as in steering. The clutch members 90 and 91 are normally spring urged inwardly into driving relation with the shaft 86. They are moved outwardly by the air pressure operated members N' and P' controlled by the on and off valves N and P, see Figure 4. The shaft 86 rigidly carries a locking member 98 which is adapted to be engaged by either or both of the locking pawls 99 and 100, see Figure 15, such pawls constituting respectively the lock against forward travel and the lock against rear travel. As stated, the electrical conductors extend through the king pin and compressed air is also led through the king pin by swivel joint connections in the usual manner.

The pawls 99 and 100 are normally held out of engagement with the notched wheel 98 by means of springs, as shown, and are allowed to drop into engagement with the wheels whenever the air actuated member M' or L' respectively is supplied with compressed air, such members being controlled by the on and off valves M and L, see Figure 4.

Figures 12 and 13 show the manner in which the shift pinion 78 is moved from its normal neutral position either upwardly into engagement with the gear 79 adapted for connection with the travel gear mechanism or downwardly into engagement with the gear 80 for swinging operation.

The rock shaft 81 raises or lowers the pinion 78 and is rocked into travel position by the air cylinder C' and into swinging position by the air cylinder D'. The shaft 81 is provided with a short socketed lever 101 which is connected with the sliding member 102. The member 102, as shown most clearly in Figure 12, slidably receives the piston rods from the cylinders C' and D' and washers 103 and 104 are engaged by springs 105 and 106, the outer ends of the springs bearing against a lock nut carried by the pistons of the respective cylinders C' and D'.

When the cylinder C' is furnished with compressed air, the washer 103 is forced over into engagement with the guiding bracket 107 and at this time further compression of the spring has no effect on driving the member 102 to the left, as viewed in Figures 12 and 13. The pinion 78 is then in mesh with the gear 79.

Similarly, when compressed air is furnished the cylinder D', the spring 106 is compressed and the washer 104 engages the bracket 108, at which time the pinion 78 is in mesh with the gear 80.

When the cylinder C' is operated, the swing lock 82 through the link connection 109 is in locking engagement with the gear 80 and thus locks the crane against swinging motion.

Figures 16, 17 and 18 show the boom hoist drum assembly.

The air cylinder or diaphragm operated member B', see Figures 16, 18 and 4, rocks the shaft 77 to lift the boom hoist shift pinion 72 upwardly into engagement with the pinion 71, see Figure 9, spring means 110, see Figure 18, being provided for normally holding the pinion out of engagement. When the shaft 77 is rocked, the brake drum band control shaft 111, see Figures 16 and 17, is also rocked as it is connected by the link 112, Figure 16, with the shaft 77. The rocking of the shaft 111 causes the clutch portion 113, see Figure 17, to loosen the brake band 76 when the pinion 72 is lifted upwardly into driving position for the boom hoist and tightens the brake when the pinion 72 is moved out of driving position. Therefore it is apparent that the member B' controls both the boom hoist and boom hoist brake.

The left and right drum 8 and 8' and the associated parts will now be described, attention being directed to Figures 11, 14, 19, 20 and 21.

The drums 8 and 8' are customarily designated left and right drums because of their mechanical position on the machine, as shown in the plan view of Figure 11. They are similar in their control and one alone need be described in detail, for example the left drum 8, it being understood that in clamshell bucket operation, for instance, one of the drums would control the closing line and the other the holding line. This illustration, it is believed, is sufficient as the use of the two drums is well known in crane operation.

The left drum 8 has a portion that overhangs the rotating spider 114, see Figure 14, carried by the continuously rotating drum shaft 69 and spring pressed drag shoes 115 are carried by the spider and have frictional engagement with the interior of the overhanging portion of the drum 8, as shown in Figure 14. Further it will be seen from Figures 11 and 14 that a drum clutch is provided for each of the drums 8 and 8' and their clutch bands are respectively indicated by the reference characters 116 and 117. These clutches are controlled by means of the air cylinders G' for the left drum clutch and H' for the right drum clutch, see Figures 14 and 4. The clutches in both cases are spring urged open and are closed by air pressure.

The left drum brake rock shaft for applying the brake is indicated by the reference character 118 and the brake band may be operated therefrom in any suitable manner, not shown. The right drum brake rock shaft for applying the right drum brake is indicated by the reference character 119, see Figures 11 and 19. If the operator is in the cab, these rock shafts may if desired be controlled by the foot pedals 120 and 121 respectively in the usual manner. The construction is the same for both.

Figures 19 and 20 show the construction for the left brake drum which is controlled by the foot pedal 120. This foot pedal is connected by means of the arm 122 with the rock shaft 118. The arm 122, however, is loose on the rock shaft 118 and is provided with a shouldered portion 123 which engages a shouldered portion 124 carried by the hub 125 rigid on the shaft 118, see Figure 20, so that when the pedal is depressed, the shaft is rocked to apply the brake. On the other hand, the shaft can be rocked without depressing the pedal when the pedal is in its up position. A spring 126 is connected by means of the link 127 with an extension of the arm 122 so as to hold the arm up when the shaft 118 is rocked independently of the foot pedal in a manner hereinafter described.

Under remote control operation, the brakes are held set by spring means. For example, a spring 128 may urge the piston rod of the air cylinder E' to the left as viewed in Figure 19, thus applying the brake through the piston rod operated member 129 and the slotted connection 130 with a lever 131 rigid on the shaft 118. A much lighter spring 132 is connected to an arm on the hub 125 through the medium of the curved link 132' and tends to hold the brake open. When the device is remote controlled, the spring 128 is in full action and overpowers the spring 132, thus holding the brake set by spring pressure, the brake being released when the air is supplied the cylinder E'.

When it is desired to operate the brake by means of the foot pedal 120, air is admitted to the cylinder E', thus releasing the brake, and thereafter the brake is applied by means of the foot pedal in the ordinary way, the slot 130 allowing independent action of the foot pedal under these conditions.

The right drum brake is indicated by the reference character 133 in Figure 11 and is controlled in exactly the same manner as the left drum brake, such right drum brake being controlled either by the foot pedal 121, see Figure 11, or by the air cylinder F', see Figure 4.

The beveled gear drive from the main horizontal drive shaft 68, see Figures 9 and 11, to the vertical shaft 70 of Figure 9 will now be described. This drive is through a beveled gear 134, see Figure 9, which is rigid with the vertical shaft 70 and which is always in mesh with the two beveled gears 135. The beveled gears 135, see Figure 11, are loose on the shaft 68 and are connected thereto by means of the left and right reversing clutches indicated generally at 136 and 137. These clutches are caused to close when the respective air cylinder I' or J' is supplied with compressed air.

Any suitable type of clutch can be employed. For example as shown in the small detail Figure 21 for the right reversing clutch, the control lever 138 for opening or closing the clutch is held in open position by the spring 139, such spring being overpowered when air is supplied the cylinder J', thus setting the clutch. Suitable limiting and adjusting means is provided in the customary manner, as shown in Figure 21, for instance, the adjusting lever being indicated at 140 and a limit link at 141. These reversing clutches are controlled through the pressure regulating valves I and J respectively, as indicated in Figure 4, so that the clutches may be gradually applied. The engine clutch control lever is indicated by the reference character 142, see Figure 11. The clutch is normally held in open position by the spring 143 and is closed by the air pressure operated diaphragm member A', see Figures 11 and 4, such member being controlled by the on and off valve A, as shown in Figure 4.

*Brief summary of mechanical operations*

From the description it is clear that the shift pinion 78 may be driven in either direction through the medium of the right and left reversing clutches 136 and 137 controlled by the pressure regulating valves I and J, and that the pinion 78 may be moved into mesh with either the traveling mechanism or the swinging mechanism by means of the on and off valves C and D. When in engagement with the travel gear, the swing lock is applied. Also the boom hoist may be connected with the main drive shaft 68 through the medium of the shift pinion 72 which is controlled by the on and off valve B, the pinion 72 being driven in either direction by the selective operation of the reversing clutches 136 and 137 which in turn, as stated, are controlled by the pressure regulating valves I and J.

The left and right drum brake may be released in a gradual manner by the pressure regulating valves E and F and the left and right drum clutches may be closed under the control of the on and off valves G and H.

The engine clutch is closed when air is supplied the member A' under the control of the on and off valve A.

The rear travel lock for locking against rear travel is applied by the member L' when supplied by air and is under the control of the on and off valve L. The forward travel lock 99, Figure 15, is applied when air is supplied the member M' under the control of the on and off valve M.

The left steering clutch 91 is moved to open position with respect to the drive shaft 86, see Figure 10, and into interlocking engagement with the pin 97 so as to cause the machine to steer to the left when air is supplied the member N', which is under the control of the on and off valve N. Similarly the right steering clutch 90 is moved to the right out of operative engagement with the shaft 86 and into interlocking engagement with the pin 96 when air is supplied the member P' under the control of the on and off valve P.

*Electrical system for the remote control*

The electrical system for the remote control comprises the series of switches 21 to 29 and the three controllers, two of the controllers having auxiliary switches in their handles.

In the diagrammatic showing of Figure 3, all of the switches 21 to 29 are in open position when down and in closed position when up.

All of the electrical power for the remote control is turned on or off by the switch 21, it being understood that the battery switch to the line 32 is normally closed and that any means whatsoever, whether a manual switch as shown or whether an automatic switch, may be employed between the dynamo 31 and the battery for maintaining the battery charged in the customary manner.

When the power switch 21 is closed, current is furnished the air cut-off and relief valve K, thus closing the valve and allowing air pressure to be supplied the pneumatic system from the supply tank. At any time that the switch 21 is open, the electrical power for the remote control is cut off and also the air supply to the pneumatic system is cut off and the air pressure is immediately relieved. In the event any of the valves stick or any other failure to function occurs, the operator at the remote control can instantly cut off the supply of air and discharge all air in the system, thus allowing the clutches to open and the brakes to close and insuring safety.

The engine clutch is closed when the switch 22 is closed, as this switch controls the valve A which in turn controls the opening or closing of the engine clutch.

The invention has been shown as applied to a simple load handling crane having a single hoisting cable which is operated by the left drum. The left drum controller arm 16 gets its power directly from the power line in the remote control means and when moved in a clockwise direction, current is passed through the resistance element 144 to the left drum brake release valve E, but this current is relatively small and the brake still has a holding effect. The controller arm 16 simultaneously engages the contact segment 145 and passes current to the left drum clutch control valve G, fully opening such valve and allowing the left drum clutch to close. The motion of the controller handle is continued in a clockwise direction so as to relieve the brake in a graduated manner due to the action of the pressure regulating left drum brake release valve E, and thus allows the gradual release of the brake as the clutch takes hold, for the friction clutch obviously requires a short interval of time to take hold of the load. Thus there is no slipping down of the load but a smooth action is obtained.

Assume that the load is in elevated position. When the left drum controller arm 16 is moved in a counterclockwise direction, it passes current through the resistance 146 to the left drum brake release valve E but does not energize the clutch. This left drum brake is gradually released, depending upon how much of the resistance 146 is cut out, so that the descent of the load is at all times under the control of the operator and the intensity with which the braking action is exerted is directly under the remote operator's control so that a smooth, accurately controlled lowering of the load is obtained. It is to be noted that the resistances 146 and 144 are connected together.

In the event a two-cable crane is employed, such for instance as in clamshell bucket operation where one of the cables is the holding line and the other cable is the closing line, the right drum controller is also used. This controller is operated in exactly the same manner as that described for the left drum controller. It is to be noted that the resistance elements 147 and 148 are connected together and to the right drum brake release valve F, which is also a pressure regulating valve similar to the valve E. The segment 149 is connected to the right drum clutch valve H so that when the controller arm 17 is moved in a counterclockwise direction, the clutch is closed and the brake is gradually released, which corresponds to the hoisting operation governed by this controller. When the controller arm 17 is moved in a clockwise direction, it releases the brake but does not close the clutch, as previously described for the left drum controller. While the operation of the two cables can be controlled by the operation of the two controllers, namely, the left drum controller and the right drum controller, it has been found to facilitate matters if the right drum brake, for instance, is released at the time that the left drum controller is moved to cause the operation of the left drum for the reason that during hoisting operation controlled by the left drum controller, it is desirable to wind the cable on the right drum and consequently it is desirable to release the right drum brake and allow the drag mechanism hereinabove described to wind the cable on the right drum while the actual power is transmitted to the cable of the left drum.

This is readily accomplished by closing the small switch 19, shown diagrammatically in Figure 3, which is located, as previously described, on the handle of the left drum controller so that the operator can with one hand not only control the operation of the left drum controller for either raising or lowering, but also may release the brake on the right drum by merely closing the switch 19.

Similarly the operator when operating the right drum controller can close the switch 18 and release the brake on the left drum, allowing the drag mechanism to operate. This increases the speed and the facility of operation. For example, if the left drum operates the closing line of a clamshell bucket and it is desired to open the bucket and discharge the load, the operator does not have to operate both drum controllers but may merely move the left drum controller in a counterclockwise direction to lower the load and may leave the switch 19 open, thus causing the brake of the right drum to remain set and to thus cause the holding line to support the bucket while the closing line is slackened. On the other hand, if the operator merely wished to lower the load without discharging from the clamshell bucket, he would close the switch 19, thus releasing the brake on the right drum controller, and move the left drum controller in a counterclockwise direction so that the two cables unwind at the same rate. This is only one of the many ways in which the device can function.

If it is desired to cause the crane to travel, the travel gear switch 27 is closed. If the boom hoist gear switch 25 is closed, no power will be allowed to pass to the switch 27, but, on the other hand, if the boom hoist gear switch is in open position, current is furnished the travel gear switch 27 and consequently the travel gear valve C is opened and the travel gear is shifted into engagement with the travel gear train. Motive power is transmitted to the travel gear train and consequently to the crawlers through either the left reversing clutch or the right reversing clutch which are under the control of the pressure regulating valves I and J.

The controller at the left-hand end of the remote control unit may be operated to cause one or the other of the reversing clutches to close in a graduated manner. However, current is not furnished the controller arm 20 directly but is furnished through either the right contact segment 150 or the left contact segment 151, depending on which of the travel lock switches 23 or 24 is in open position. Assume that both travel lock switches are in open position. Then either one or the other of the reversing clutches can be closed, depending on the direction of movement of the controller arm 20. Assume that the controller arm 20 is moved in a clockwise direction, it then engages the contact segment 150 and current is also passed through the resistance 152 to the right reversing clutch pressure regulating valve J so that the right reversing clutch is gradually applied, depending on the position of the arm 20, and thus the crane is caused to travel forwardly.

If through any chance, the front travel lock switch 24 were in closed position, it is apparent that the crane could not travel forward as the segment 150 would then be dead as the switch 24 would be in its upper or closed position and power to the segment 150 would be cut off. Thus it is impossible to travel forwardly against the front travel lock. The front travel lock would remain closed, however, as current would be furnished the front travel lock control valve M.

Assume that the controller arm 20 is moved in a counterclockwise direction, it will engage the segment 151 and current will be passed through the resistance 153 to the left reversing clutch pressure regulating valve I and this clutch would be closed in a graduated or controlled manner, depending on the position of the arm 20. This would cause rear travel of the crane if the rear travel lock switch 23 were in open position, as current would then be furnished to the segment 151. On the other hand, if the rear travel lock were in closed position, the segment 151 would be dead and the crane would not travel against the rear travel lock. However, the rear travel lock would remain closed, as current would be furnished through the switch 23 to the valve L controlling the rear travel block.

If it is desired to turn to the right, the right steering clutch switch 29 would be closed, and if the left steering clutch switch was open, current would be furnished through the switch 29 to the right steering clutch control valve P, and consequently the right steering clutch would be disengaged from the main drive shaft for the crawlers and would lock the right crawler against motion. Thereafter if the controller arm 20 were moved to forward travel position, that is in a clockwise direction, the crane would steer to the right. Similarly if the left steering clutch switch 28 were closed and the right steering clutch switch 29 was open, current would be furnished to the left steering clutch control valve N and the left crawler would be disconnected from the motive power and locked against motion. Thereafter if the controller arm 20 were moved in a clockwise direction, that is to say, towards forward travel position, the crane would travel forwardly and steer to the left. Obviously rearward steering could be effected if it became necessary by moving the controller arm 20 to the rearward travel position, that is to say, in a counterclockwise direction.

If it is desired to raise or lower the boom, the boom hoist gear switch 25 is closed, and if the swing gear switch 26 is open, current will be furnished through the switch 25 to the valve B for controlling the boom hoist gear, and the boom hoist gear would thus be shifted into engagement with the boom hoist gear train. Thereafter if the controller arm 20 were moved in a clockwise direction, the boom would be lowered as the right reversing clutch would be closed and power would be transmitted to the boom hoist train to lower the boom. If the controller arm 20 were moved in a counterclockwise direction, the left reversing clutch would be closed and power would be furnished the boom moist gear train to raise the boom.

If the swing gear switch 26 were closed and the travel gear switch 27 were open, current would be furnished through the swing gear switch 26 to the valve D for controlling the swing gear and the swing lock. The swing gear would be shifted into engagement with the swing gear train and the swing gear lock would be unlocked. Thereafter if the controller arm 20 were moved in a clockwise direction, right swinging would occur as the right reversing clutch would be closed, as previously described, and if moved in a counterclockwise direction, left swinging would occur as the left reversing clutch would be closed. This would be independent of the position of the rear travel lock and the front travel lock switches 23 and 24 as current would be furnished the controller arm 20 through the travel gear switch 27 when it was in its open position.

It will be seen that complete control of the operation of the crane, whether of a two-cable type or of a single cable type, is obtained from the remote controller and the operator has a graduated control of the right and left drum brake release and of the right and left reversing clutches so that no undue shock can be imposed on the mechanism of the crane and so that the operator has direct control of all of the functions of the machine and may reproduce all of the controlling functions that an operator located in the cab could have produced. He can very gradually lower the load or he can raise the load and gradually shift from the holding brake to the clutch for hoisting. He can graduate the degree of engagement of the right or left reversing clutch and so can graduate the starting and stopping for front or rear travel or steering or for raising or lowering the boom or for the right and left swinging motions.

A very small amount of power need be carried by the cable to the remote control as the actual power used to operate the mechanical control members of the crane is furnished by the pneumatic system and yet the motion or operation of these mechanical control elements in the crane is always under the complete control of the remotely positioned operator.

Further it is to be seen that the interlocking arrangement is such that no conflicting operations can be caused and no thought is required on the part of the operator to avoid these conflicting operations, as they are automatically avoided by the interlocking of the switches. The operator, therefore, is left free to adjust the appropriate controller after the selected interlocking switch has been operated. Further than this, the arrangement is such that it makes for very speedy operation of the crane.

Additionally, in the event of any unexpected condition suddenly obtaining, the power to the remote control system may be instantly shut off by the remote operator or the engine clutch may be opened, and when the power is cut off from the remote control system by the switch 21, there is immediate cutting off of air supply to the pneumatic system and immediate relief of all pressure in such system. Thus maximum safety is obtained.

Further it is to be noted that all of the controllers may be exactly alike and such contact segments as may be needed can be used. The controllers are of very simple construction and are inexpensive. Additionally, the interlocking switches 21 to 29 are all exactly alike and close in the same direction and are simple double-throw, single pole switches. Thus the remote control unit may be very cheaply manufactured and is not likely to get out of order and is substantially fool-proof in its action.

It sometimes happens that a part of the work to be done by the crane has to be done from a remote point and a part of the work can be done directly from the cab of the crane. The device is very flexible and allows for this quick changeover.

When the remote control operation is not needed, the remote control unit may be placed in the cab as described and plugged in with a shorter cable, and thereafter the operator can either control the entire crane through the remote control unit or else he may control the major number of the parts from the remote control unit and may supplement this control by using the foot pedals. Thus the operator can, if desired, have both the control through the remote control unit and through a manual control or he may have the control entirely through the remote control unit whether located at a remote point or within the cab.

While one form of crane only has been shown, it is to be understood that the invention is not limited to this particular type of crane but is applicable to many different types of cranes.

While a simple load handling crane has been shown, it is to be understood that any type of load handling machine could be employed, and the term "crane" therefore and the expression "load handling" are to be interpreted not in a limiting sense but to cover any of the general types of machines hereinbefore referred to and any type of load handling means.

While the device has been shown as provided with pneumatic intermediate control means and while such type of control means is preferred, it is nevertheless to be understood that in its broader aspects this invention comprehends the use of any intermediate fluid control means.

Although a conventional non-reversing internal combustion motor has been shown in Figure 11, nevertheless the invention is not limited to this type of motor except where it is specifically recited. It is possible with this invention, however, as is apparent from the previous description, to obtain all of the many functions of the crane or other load handling device with the same degree of flexibility as though separate reversing motors had been employed for the several different functions.

Although this invention has been described in considerable detail, it is to be understood that such description is intended as illustrative rather than limiting, as the invention may be variously embodied and is to be interpreted as claimed.

We claim:

1. A remote controlled load handling device comprising a self-propelled crane having as its power means an internal combustion engine and including power operated load handling means and fluid actuated intermediate control means for controlling the operation of the load handling means for power operation from said internal combustion engine, and remote control means including electrically controlled means for controlling the operation of the fluid actuated intermediate control means.

2. A remote controlled load handling device comprising a crane including a power means and power operated load handling means and fluid actuated intermediate control means for controlling the operation of the load handling means for power operation from said power means, said power means furnishing power for said fluid actuated intermediate control means, and remote control means including electrically controlled means for controlling the power operation of the fluid actuated intermediate control means.

3. A remote controlled load handling device comprising a crane having as its power means a continuously running, non-reversing motor and including a plurality of power operated mechanisms, a plurality of fluid actuated intermediate control means for controlling the operation of said power operated mechanisms, and remote control means including electrically controlled means for selectively controlling the operation of said fluid actuated intermediate control means.

4. A remote controlled load handling device comprising a crane including power operated load handling mechanism, braking means for said mechanism, fluid actuated intermediate control means for controlling both the power operation and the braking operation of said load handling means, a continuously running, non-reversing motor furnishing the power for said load handling means and for said fluid actuated intermediate control means, and remote control means including electrical means for controlling said fluid actuated intermediate control means.

5. A remote controlled load handling device comprising a crane including power operated load handling mechanism, braking means for said mechanism, fluid actuated intermediate control means for controlling both the power operation and the braking operation of said load handling means, and remote control means including electrical means for controlling said fluid actuated remote control means, said remote control means and said braking means producing a gradually variable value of the braking effect of said braking means.

6. A remote controlled load handling device comprising a crane including power operated load handling mechanism, clutch means for controlling the power transmitted to said load handling mechanism, braking means for said load handling mechanism, fluid actuated intermediate control means for independently controlling said clutch means and said braking means, and remote control means including electrical means for controlling the operation of said fluid actuated intermediate means.

7. A remote controlled load handling device comprising a crane including power operated load raising means, braking means for said load raising means, power operated load swinging means, fluid actuated intermediate control means for controlling said power operated load raising and swinging means and said braking means, and remote control means for controlling the operation of said fluid actuated intermediate control means, said remote control means including electrical means for producing through the action of said fluid actuated intermediate means a gradually variable value of the braking effect of said braking means.

8. A remote controlled load handling device comprising a crane including power operated load raising means, power operated traveling means, fluid actuated intermediate means for controlling the operation of said load raising means and said traveling means, and remote control means including electrical means for controlling said fluid actuated intermediate means.

9. A remote controlled load handling device comprising a crane including power operated load handling means, braking means for said power operated load handling means, fluid actuated intermediate control means for controlling the operation of said power operated load handling means and said braking means, fluid pressure cut-off and relief means, and remote control means for controlling said fluid actuated intermediate control means and said fluid pressure cut-off and relief means.

10. A remote controlled load handling device comprising a crane including power operated load handling means, braking means for said power operated load handling means, fluid actuated intermediate control means for controlling the operation of said power operated load handling means and said braking means, fluid pressure cut-off and relief means, and remote control means including electrical means for controlling said fluid actuated intermediate control means and said fluid pressure cut-off and relief means.

11. In a remotely controlled crane, a boom, boom swinging mechanism, boom hoisting mechanism, a continuously running, non-reversing motor, means for selectively operating either said boom swinging or boom hoisting mechanism from said motor; remote control means including electrical interlocking switch means for selectively controlling the operation of said boom swinging and boom hoisting mechanisms, said electrical interlocking switch means precluding simultaneous operation of the boom swinging and boom hoisting mechanisms, and switch means for controlling the transmission of power from said motor to either of said mechanisms.

12. In a remotely controlled crane having a boom and having traction means, a continuously running, non-reversing motor, boom swinging mechanism, traction mechanism for driving said traction means, and reversing mechanism between said swinging mechanism and traction mechanism and said motor; and remote control means including electrical interlocking switch means for selectively controlling said swinging and traction mechanism, said electrical interlocking switch means precluding simultaneous operation of the swinging and traction mechanism, and switch means for controlling said reversing mechanism.

13. In a remotely controlled crane having a boom and having traction means, a motor, boom swinging mechanism, traction mechanism for driving said traction means, and reversing mechanism between said swinging mechanism and traction mechanism and said motor; and remote control means including electrical interlocking switch means for selectively controlling said swinging and traction mechanism, said electrical interlocking switch means precluding simultaneous operation of the swinging and traction mechanism, and switch means for controlling said reversing mechanism, said last mentioned switch means having a graduated control of said reversing mechanism.

14. In a remotely controlled crane having a boom and having traction means, a boom gear train for swinging said boom, a traction gear train for driving said traction means, a sliding gear for selectively engaging said boom or traction gear train, a non-reversing motor, reversing mechanism between said motor and said gear; and remote control means including electrical interlocking switch means for selectively controlling said sliding gear, said electrical interlocking switch means precluding the simultaneous urging of said sliding gear in opposite directions, and a control switch means for controlling said reversing mechanism.

15. A remote controlled load handling device comprising a crane including power means, power operated load handling means and local fluid actuated intermediate control means operated from energy derived from the power means for controlling the operation of the load handling means for power operation, and remote control means for controlling the operation of the fluid actuated intermediate control means, said remote control means being located at a point spaced from said crane.

16. A controlled load handling device comprising a crane including power means, power operated load handling means and local fluid pressure actuated intermediate control means for controlling the operation of the load handling means for power operation, a pump driven from said power means for furnishing the fluid pressure, and remote control means including electrically controlled means for controlling the operation of the fluid actuated intermediate control means independently of said pump.

17. In a remotely controlled crane having a boom and having traction means, a single, continuously running, non-reversing motor, boom swinging mechanism, traction mechanism for driving said traction means, and reversing mechanism between said swinging mechanism and traction mechanism and said motor; and remote control means for selectively controlling said swinging and traction mechanism and for controlling said reversing mechanism, said remote control means being located at a point spaced from said crane and being portable independently of any motion of said crane.

18. A remote controlled load handling device comprising a self-propelled crane formed as a unitary, self-contained device and having a power plant and including a non-reversing, continuously running internal combustion engine, load handling means driven from said engine, intermediate power operated control means for controlling the operation of said load handling means from said engine, said intermediate power operated control means being supplied with power from said engine, and electromagnetic means for controlling said intermediate power operated means; and remote control electric means separate and distinct from said crane for controlling said electromagnetic means and connected therewith by a flexible multi-stranded electric cable.

EDWARD B. NICKLES.
JOHN D. WEST.